United States Patent
Lee et al.

(10) Patent No.: US 10,625,624 B2
(45) Date of Patent: Apr. 21, 2020

(54) METHOD AND APPARATUS FOR TRANSFERRING WIRELESS POWER TO ELECTRIC VEHICLE USING CONTROLLING TURNS OF COIL

(71) Applicants: Hyundai Motor Company, Seoul (KR); Kia Motors Corporation, Seoul (KR)

(72) Inventors: Woo Young Lee, Gyeonggi-do (KR); Jong Pil Kim, Do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/157,699

(22) Filed: Oct. 11, 2018

(65) Prior Publication Data

US 2019/0111797 A1 Apr. 18, 2019

(30) Foreign Application Priority Data

Oct. 16, 2017 (KR) .................. 10-2017-0134084
Sep. 12, 2018 (KR) .................. 10-2018-0108778

(51) Int. Cl.
| | |
|---|---|
| *H02J 7/00* | (2006.01) |
| *B60L 53/38* | (2019.01) |
| *H02J 50/90* | (2016.01) |
| *H02J 7/02* | (2016.01) |
| *H02J 50/12* | (2016.01) |
| *B60L 53/12* | (2019.01) |

(52) U.S. Cl.
CPC .............. *B60L 53/38* (2019.02); *B60L 53/12* (2019.02); *H02J 7/025* (2013.01); *H02J 50/12* (2016.02); *H02J 50/90* (2016.02)

(58) Field of Classification Search
CPC ............. H02J 50/90; H02J 50/12; H02J 7/025
USPC ........................................................ 320/108
See application file for complete search history.

(56) References Cited

U.S. PATENT DOCUMENTS

| | | | |
|---|---|---|---|
| 2016/0176301 A1* | 6/2016 | Huang | H01F 38/14 320/108 |
| 2016/0241084 A1* | 8/2016 | Guo | H02J 50/12 |
| 2017/0194817 A1* | 7/2017 | Takatsu | H02J 50/12 |
| 2017/0274787 A1* | 9/2017 | Salter | B60L 11/1829 |
| 2017/0326991 A1* | 11/2017 | Budhia | H02J 50/12 |
| 2019/0097448 A1* | 3/2019 | Partovi | H02J 7/025 |

* cited by examiner

*Primary Examiner* — Suchin Parihar
(74) *Attorney, Agent, or Firm* — Mintz Levin Cohn Ferris Glovsky and Popeo, P.C.; Peter F. Corless

(57) ABSTRACT

A method for wireless power transfer (WPT) to an electric vehicle (EV) performed by a wireless charging apparatus may include detecting, by the wireless charging apparatus, an alignment state between a transmission pad mounted in the wireless charging apparatus and a reception pad mounted in the EV; controlling, by the wireless charging apparatus, a number of turns in a transmission coil included in the transmission pad or a reception coil included in the reception pad according to the detected alignment state; and performing, by the wireless charging apparatus, WPT to the EV after the controlling of the number of turns in the transmission coil or the reception coil is completed.

16 Claims, 7 Drawing Sheets

METHOD AND APPARATUS FOR TRANSFERRING WIRELESS POWER TO ELECTRIC VEHICLE USING CONTROLLING TURNS OF COIL

CROSS-REFERENCE TO RELATED APPLICATIONS

The present application claims priority to Korean Patent Application No. 10-2017-0134084, filed on Oct. 16, 2017 in the Korean Intellectual Property Office (KIPO), and Korean Patent Application No. 10-2018-0108778, filed on Sep. 12, 2018 in the KIPO, the entire contents of both of which are incorporated herein by reference.

TECHNICAL FIELD

The present disclosure relates to a method and an apparatus for transferring wireless power to an electric vehicle (EV), and more specifically, to a method and an apparatus for transferring wireless power to an EV by controlling the number of turns in a transmission coil or a reception coil in order to resolve deterioration of output voltage or loss of magnetic inductance.

BACKGROUND

An electric vehicle (EV) charging system may be defined as a system for charging a high-voltage battery mounted in an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type").

When charging an EV wirelessly, a reception coil in a vehicle assembly (VA) mounted in the EV forms an inductive resonant coupling with a transmission coil in a group assembly (GA) located in a charging station or a charging spot. Electric power is then transferred from the GA to the VA to charge the high-voltage battery of the EV through the inductive resonant coupling.

In a WPT system, an equivalent circuit of a transmission pad and a reception pad may be implemented by a transformer. The transformer implemented in this manner has a much larger air gap than usual converter-type transformers, and has a very low coupling coefficient. Since a leakage inductance $L_{lk}$ is relatively large as compared with a magnetization inductance $L_m$, it is difficult to transfer electric power to the output. Therefore, at least one capacitor is implemented in a primary pad and a secondary pad, i.e., the transmission pad and the reception pad, respectively, to resonate inductance of the primary and secondary pads and the at least one capacitor.

However, in the event of misalignment between the transmission pad and the reception pad, the magnetization inductance and the leakage inductance may fluctuate. This can cause a failure to reach resonance, thereby lowering a voltage and current transferred to the output and reducing overall efficiency.

Various types of coil structures have been proposed including a circular coil having a circular shape and a "DD" coil having two D-shaped coils. However, when the transmission and reception pads are composed of coils having different shapes (e.g., the circular coil for the transmission pad and the DD coil for the reception pad), a problem can occur in that the voltage and current transferred to the output decrease and the overall efficiency is reduced.

SUMMARY

Embodiments of the present disclosure provide a method for performing WPT to an EV, which is performed by an apparatus for wirelessly transferring power to the EV, by controlling the number of turns in at least one coil of a transmission pad and/or a reception pad.

Embodiments of the present disclosure also provide an apparatus for performing WPT to an EV by controlling the number of turns in at least one coil of a transmission pad and/or a reception pad.

Embodiments of the present disclosure also provide an EV capable of controlling the number of turns in at least one coil of a transmission pad and/or a reception pad.

According to embodiments of the present disclosure, a method for wireless power transfer (WPT) to an electric vehicle (EV) performed by a wireless charging apparatus may include: detecting, by the wireless charging apparatus, an alignment state between a transmission pad mounted in the wireless charging apparatus and a reception pad mounted in the EV; controlling, by the wireless charging apparatus, a number of turns in a transmission coil included in the transmission pad or a reception coil included in the reception pad according to the detected alignment state; and performing, by the wireless charging apparatus, WPT to the EV after the controlling of the number of turns in the transmission coil or the reception coil is completed.

The detecting of the alignment state may include detecting a Z-class of the reception pad according to a vertical distance between a ground surface and the reception pad.

The method may further include controlling at least one switch connected to the transmission coil or the reception coil while the number of turns in the transmission coil or the reception coil is controlled.

The at least one switch may comprise at least one first switch connected to an input node and an output node of the transmission coil or the reception coil and at least one split node dividing the transmission coil or the reception coil by a preset ratio; and at least one second switch configured to open or close the at least one split node.

The controlling of the number of turns in the transmission coil or the reception coil may be performed when a deviation between a center axis of the transmission pad and a center axis of the reception pad according to the detected alignment state is greater than or equal to a preset threshold value, or performed when respective shapes of the transmission coil and the reception coil are different from each other.

The method may further include, when the controlling of the number of turns in the transmission coil or the reception coil is performed, controlling the at least one switch to decrease a turn ratio, which represents a ratio of the number of turns in the transmission coil to the number of turns in the reception coil, when an output voltage of the reception coil is less than a preset threshold value.

The controlling of the number of turns in the transmission coil or the reception coil may be performed when the Z-class of the reception pad is different from a predetermined class.

The method may further include, when the controlling of the number of turns in the transmission coil or the reception coil is performed, controlling the at least one switch to increase the number of turns in the transmission coil or the reception coil when the Z-class of the reception pad is greater than the predetermined class.

The method may further include further controlling the at least one switch to decrease the turn ratio.

Furthermore, in accordance with embodiments of the present disclosure, an apparatus performing wireless power transfer (WPT) to an electric vehicle (EV), the apparatus comprising at least one processor and a memory storing instructions executable by the at least one processor, wherein the at least one processor may be configured to: detect an alignment state between a transmission pad mounted in the wireless charging apparatus and a reception pad mounted in the EV; control a number of turns in a transmission coil included in the transmission pad or a reception coil included in the reception pad according to the detected alignment state; and perform WPT to the EV after the controlling of the number of turns in the transmission coil or the reception coil is completed.

The at least one processor may be further configured to detect a Z-class of the reception pad according to a vertical distance between a ground surface and the reception pad.

The at least one processor may be further configured to control at least one switch connected to the transmission coil or the reception coil while the number of turns in the transmission coil or the reception coil is controlled.

The at least one switch may comprise at least one first switch connected to an input node and an output node of the transmission coil or the reception coil and at least one split node dividing the transmission coil or the reception coil by a preset ratio; and at least one second switch configured to open or close the at least one split node.

The at least one processor may be further configured to control the number of turns in the transmission coil or the reception coil when a deviation between a center axis of the transmission pad and a center axis of the reception pad according to the detected alignment state is greater than or equal to a preset threshold value, or when respective shapes of the transmission coil and the reception coil are different from each other.

The at least one processor may be further configured to control the at least one switch to decrease a turn ratio, which represents a ratio of the number of turns in the transmission coil to the number of turns in the reception coil, when an output voltage of the reception coil is less than a preset threshold value.

The at least one processor may be further configured to control the number of turns in the transmission coil or the reception coil when the Z-class of the reception pad is different from a predetermined class.

The at least one processor may be further configured to control the at least one switch to increase the number of turns in the transmission coil or the reception coil when the Z-class of the reception pad is greater than the predetermined class.

Furthermore, in accordance with embodiments of the present disclosure, an EV may comprise a reception pad including a reception coil electromagnetically coupled to a transmission coil included in a transmission pad mounted in a wireless charging apparatus, the reception pad configured to wirelessly receive power; at least one switch connected to the reception coil, the at least one switch configured to control a number of turns in the reception coil; a vehicle assembly (VA) controller configured to monitor a parameter indicating a state of the EV and to control an output power level of the reception pad through communication with a ground assembly (GA); and a wireless power transfer (WPT) controller configured to control the at least one switch by detecting an alignment state between the transmission pad and the reception pad.

The at least one switch may comprise at least one first switch connected to an input node and an output node of the transmission coil or the reception coil and at least one split node dividing the transmission coil or the reception coil by a preset ratio; and at least one second switch configured to open or close the at least one split node.

According to the method and apparatus for transferring wireless power to an EV by controlling the number of turns in the coil described herein, the number of turns of the transmission coil or the reception coil and the turn ratio between the transmission coil and the reception coil can be controlled so that parameters such as the inductance of the coil or the output voltage of the reception coil can be compensated. In particular, when the transmission pad is misaligned with the reception pad or the respective types of the transmission and reception coils are different, the WPT efficiency can be optimized by controlling the number of turns of the transmission coil or the reception coil and the turn ratio between the transmission coil and the reception coil.

BRIEF DESCRIPTION OF DRAWINGS

Embodiments of the present disclosure will become more apparent by describing in detail embodiments of the present disclosure with reference to the accompanying drawings, in which.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

According to embodiments of the present disclosure, an EV charging system may be defined as a system for charging a high-voltage battery mounted on an EV using power of an energy storage device or a power grid of a commercial power source. The EV charging system may have various forms according to the type of EV. For example, the EV charging system may be classified as a conductive-type using a charging cable or a non-contact wireless power transfer (WPT)-type (also referred to as an "inductive-type"). The power source may include a residential or public electrical service or a generator utilizing vehicle-mounted fuel, and the like.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Plug-in vehicle (PV)": An electric vehicle rechargeable through wireless charging from an electric vehicle supply equipment (EVSE) without using a physical plug or a physical socket.

"Heavy duty vehicle (H.D. Vehicle)": Any four- or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system (WCS)": The system for wireless power transfer and control between the GA and VA including alignment and communications. This system transfers energy from the electric supply network to the electric vehicle electromagnetically through a two-part loosely coupled transformer.

"Wireless power transfer (WPT)": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly (GA)": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly (VA)": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA coil magnetic surface distance": the distance between the plane of the nearest magnetic or conducting component surface to the lower exterior surface of the VA coil when mounted. This distance includes any protective coverings and additional items that may be packaged in the VA coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g., an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning and pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs.

Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

According to embodiments of the present disclosure, a "rapid charging" may refer to a method of directly converting AC power of a power system to DC power, and supplying the converted DC power to a battery mounted on an EV. Here, a voltage of the DC power may be DC 500 volts (V) or less.

According to embodiments of the present disclosure, a "slow charging" may refer to a method of charging a battery mounted on an EV using AC power supplied to a general home or workplace. An outlet in each home or workplace, or an outlet disposed in a charging stand may provide the AC power, and a voltage of the AC power may be AC 220V or less. Here, the EV may further include an on-board charger (OBC) which is a device configured for boosting the AC power for the slow charging, converting the AC power to DC power, and supplying the converted DC power to the battery.

According to embodiments of the present disclosure, a light load driving or light load operation may include, for example, charging a high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments of the present disclosure will be explained in detail by referring to accompanying figures.

Figure 1:
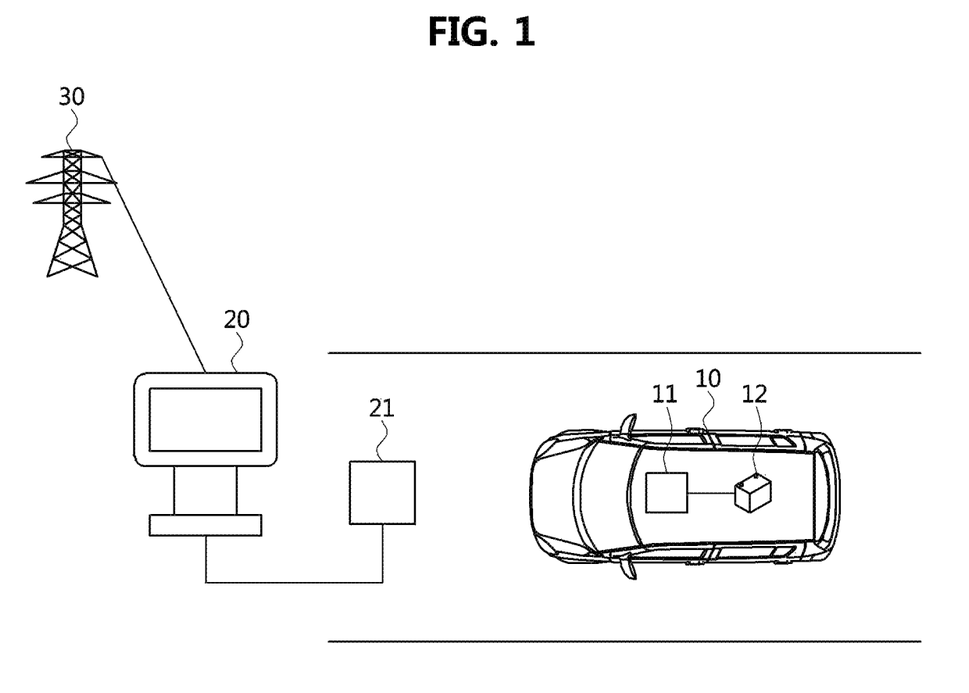
FIG. 1 is a conceptual diagram illustrating a concept of a wireless power transfer (WPT) to which embodiments of the present disclosure are applied.

FIG. 1 is a conceptual diagram illustrating a concept of a wireless power transfer (WPT) to which embodiments of the present disclosure are applied.

As shown in FIG. 1, a WPT may be performed by at least one component of an electric vehicle (EV) 10 and a charging station 20, and may be used for wirelessly transferring power to the EV 10.

Here, the EV 10 may be usually defined as a vehicle supplying an electric power stored in a rechargeable energy storage including a battery 12 as an energy source of an electric motor which is a power train system of the EV 10.

However, the EV 10 according to embodiments of the present disclosure may include a hybrid electric vehicle (HEV) having an electric motor and an internal combustion engine together, and may include not only an automobile but also a motorcycle, a cart, a scooter, and an electric bicycle.

Also, the EV 10 may include a power reception pad 11 including a reception coil for charging the battery 12 wirelessly and may include a plug connection for conductively charging the battery 12. Here, the EV 10 configured for conductively charging the battery 12 may be referred to as a plug-in electric vehicle (PEV).

Here, the charging station 20 may be connected to a power grid 30 or a power backbone, and may provide an alternating current (AC) power or a direct current (DC) power to a power transmission pad 21 including a transmission coil through a power link.

Also, the charging station 20 may communicate with an infrastructure management system or an infrastructure server that manages the power grid 30 or a power network through wired/wireless communications, and performs wireless communications with the EV 10.

Here, the wireless communications may be Bluetooth, Zigbee, cellular, wireless local area network (WLAN), or the like.

Also, for example, the charging station 20 may be located at various places including a parking area attached to the owner's house of the EV 10, a parking area for charging an EV at a gas station, a parking area at a shopping center or a workplace.

A process of wirelessly charging the battery 12 of the EV 10 may begin with first placing the power reception pad 11 of the EV 10 in an energy field generated by the power transmission pad 21, and making the reception coil and the transmission coil be interacted or coupled with each other. An electromotive force may be induced in the power reception pad 11 as a result of the interaction or coupling, and the battery 12 may be charged by the induced electromotive force.

The charging station 20 and the transmission pad 21 may be referred to as a ground assembly (GA) in whole or in part, where the GA may refer to the previously defined meaning.

All or part of the internal components and the reception pad 11 of the EV 10 may be referred to as a vehicle assembly (VA), in which the VA may refer to the previously defined meaning.

Here, the power transmission pad or the power reception pad may be configured to be non-polarized or polarized.

In a case that a pad is non-polarized, there is one pole in a center of the pad and an opposite pole in an external periphery. Here, a flux may be formed to exit from the center of the pad and return at all to external boundaries of the pad.

In a case that a pad is polarized, it may have a respective pole at either end portion of the pad. Here, a magnetic flux may be formed based on an orientation of the pad.

Figure 2:
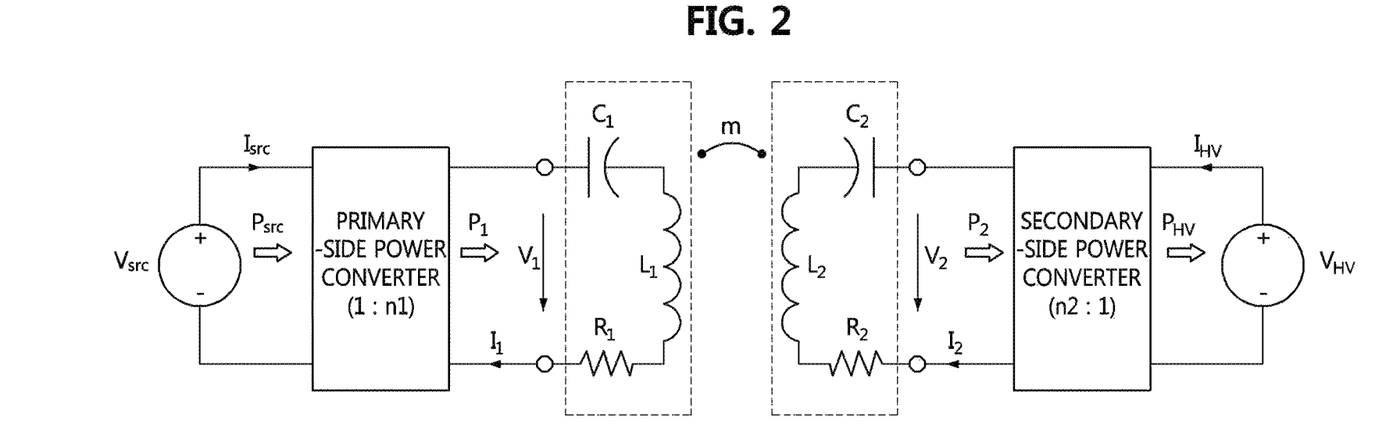
FIG. 2 is a conceptual diagram illustrating a WPT circuit according to embodiments of the present disclosure.

FIG. 2 is a conceptual diagram illustrating a WPT circuit according to embodiments of the present disclosure.

As shown in FIG. 2, a schematic configuration of a circuit in which a WPT is performed in an EV WPT system may be seen.

Here, the left side of FIG. 2 may be interpreted as expressing all or part of a power source $V_{src}$ supplied from the power network, the charging station 20, and the transmission pad 21 in FIG. 1, and the right side of FIG. 2 may be interpreted as expressing all or part of the EV including the reception pad and the battery.

First, the left side circuit of FIG. 2 may provide an output power $P_{src}$ corresponding to the power source $V_{src}$ supplied from the power network to a primary-side power converter. The primary-side power converter may supply an output power $P_1$ converted from the output power $P_{src}$ through frequency-converting and AC-to-DC/DC-to-AC converting to generate an electromagnetic field at a desired operating frequency in a transmission coil $L_1$.

Specifically, the primary-side power converter may include an AC/DC converter for converting the power $P_{src}$ which is an AC power supplied from the power network into a DC power, and a low frequency (LF) converter for converting the DC power into an AC power having an operating frequency suitable for wireless charging. For example, the operating frequency for wireless charging may be determined to be within 80 to 90 kHz.

The power $P_1$ output from the primary-side power converter may be supplied again to a circuit including the transmission coil $L_1$, a first capacitor $C_1$ and a first resistor $R_1$. Here, a capacitance of the first capacitor $C_1$ may be determined as a value to have an operating frequency suitable for charging together with the transmission coil $L_1$. Here, the first resistor $R_1$ may represent a power loss occurred by the transmission coil $L_1$ and the first capacitor $C_1$.

Further, the transmission coil $L_1$ may be made to have electromagnetic coupling, which is defined by a coupling coefficient m, with the reception coil $L_2$ so that a power $P_2$ is transmitted, or the power $P_2$ is induced in the reception coil $L_2$. Therefore, the meaning of power transfer in the present disclosure may be used together with the meaning of power induction.

Still further, the power $P_2$ induced in or transferred to the reception coil $L_2$ may be provided to a secondary-side power converter. Here, a capacitance of a second capacitor $C_2$ may be determined as a value to have an operating frequency suitable for wireless charging together with the reception coil $L_2$, and a second resistor $R_2$ may represent a power loss occurred by the reception coil $L_2$ and the second capacitor $C_2$.

The secondary-side power converter may include an LF-to-DC converter that converts the supplied power $P_2$ of a specific operating frequency to a DC power having a voltage level suitable for the battery $V_{HV}$ of the EV.

The electric power $P_{HV}$ converted from the power $P_2$ supplied to the secondary-side power converter may be output, and the power $P_{HV}$ may be used for charging the battery $V_{HV}$ disposed in the EV.

The right side circuit of FIG. 2 may further include a switch for selectively connecting or disconnecting the reception coil $L_2$ with the battery $V_{HV}$. Here, resonance frequencies of the transmission coil $L_1$ and the reception coil $L_2$ may be similar or identical to each other, and the reception coil $L_2$ may be positioned near the electromagnetic field generated by the transmission coil $L_1$.

The circuit of FIG. 2 should be understood as an illustrative circuit for WPT in the EV WPT system used for embodiments of the present disclosure, and is not limited to the circuit illustrated in FIG. 2.

On the other hand, since the power loss may increase as the transmission coil $L_1$ and the reception coil $L_2$ are located at a long distance, it may be an important factor to properly set the relative positions of the transmission coil $L_1$ and the reception coil $L_2$.

The transmission coil $L_1$ may be included in the transmission pad 21 in FIG. 1, and the reception coil $L_2$ may be included in the reception pad 11 in FIG. 1. Therefore, positioning between the transmission pad and the reception pad or positioning between the EV and the transmission pad will be described below with reference to the drawings.

Figure 3:
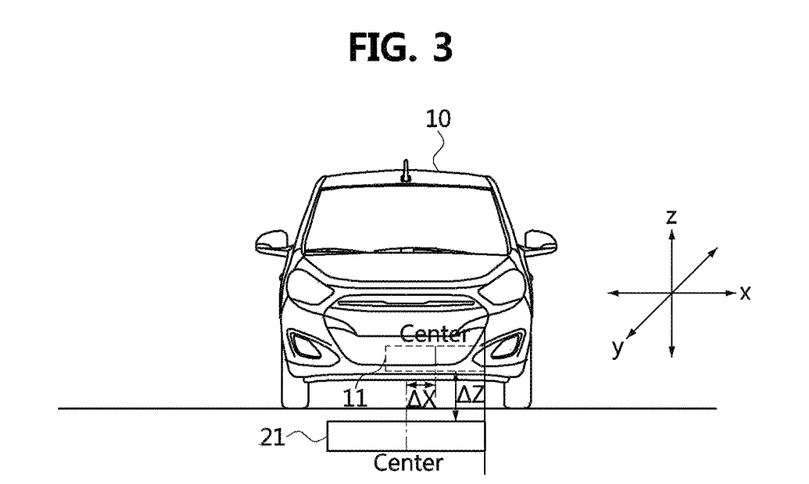
FIG. 3 is a conceptual diagram for explaining a concept of alignment in an EV WPT according to embodiments of the present disclosure.

FIG. 3 is a conceptual diagram for explaining a concept of alignment in an EV WPT according to embodiments of the present disclosure.

As shown in FIG. 3, a method of aligning the power transmission pad 21 and the power reception pad 11 in the EV in FIG. 1 will be described. Here, a positional alignment may correspond to the alignment, which is the above-mentioned term, and thus may be defined as a positional alignment between the GA and the VA, but is not limited to the alignment of the transmission pad and the reception pad.

Although the transmission pad 21 is illustrated as positioned below a ground surface as shown in FIG. 3, the transmission pad 21 may also be positioned on the ground surface, or positioned such that a top portion surface of the transmission pad 21 is exposed below the ground surface.

The reception pad 11 of the EV may be defined by different categories according to its heights (defined in the z-direction) measured from the ground surface. For example, a class 1 for reception pads having a height of 100-150 millimeters (mm) from the ground surface, a class 2 for reception pads having a height of 140-210 mm, and a class 3 for reception pads having a height of 170-250 mm may be defined. Here, the reception pad may support a part of the above-described classes 1 to 3. For example, only the class 1 may be supported according to the type of the reception pad 11, or the class 1 and 2 may be supported according to the type of the reception pad 11.

The height of the reception pad measured from the ground surface may correspond to the previously defined term "vehicle magnetic ground clearance".

Further, the position of the power transmission pad 21 in the height direction (i.e., defined in the z-direction) may be determined to be located between the maximum class and the minimum class supported by the power reception pad 11. For example, when the reception pad supports only the class 1 and 2, the position of the power transmission pad 21 may be determined between 100 and 210 mm with respect to the power reception pad 11.

Still further, a gap between the center of the power transmission pad 21 and the center of the power reception pad 11 may be determined to be located within the limits of the horizontal and vertical directions (defined in the x- and y-directions). For example, it may be determined to be located within ±75 mm in the horizontal direction (defined in the x-direction), and within ±100 mm in the vertical direction (defined in the y-direction).

Here, the relative positions of the power transmission pad 21 and the power reception pad 11 may be varied in accordance with their experimental results, and the numerical values should be understood as exemplary.

Although the alignment between the pads is described on the assumption that each of the transmission pad 21 and the reception pad 11 includes a coil, more specifically, the alignment between the pads may mean the alignment between the transmission coil (or GA coil) and the reception coil (or VA coil) which are respectively included in the transmission pad 21 and the reception pad 11.

Figure 4A:
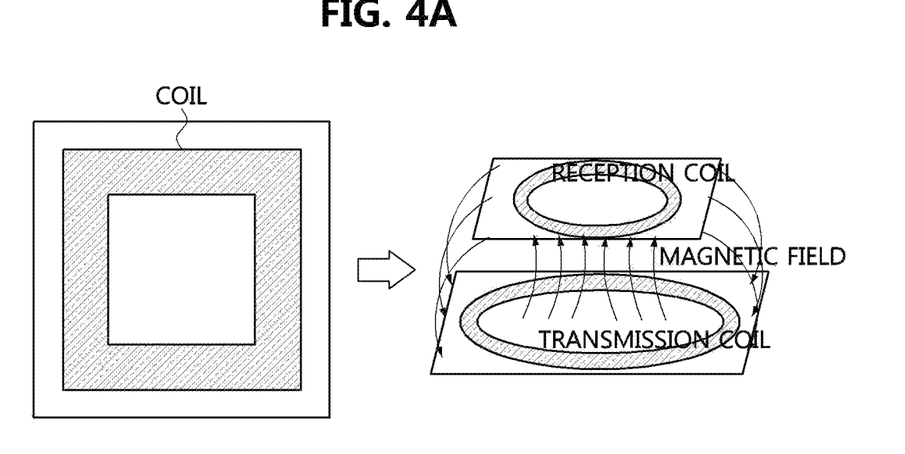
FIGS. 4A and 4B are conceptual diagrams for explaining coil shapes according to embodiments of the present disclosure.
Figure 4B:
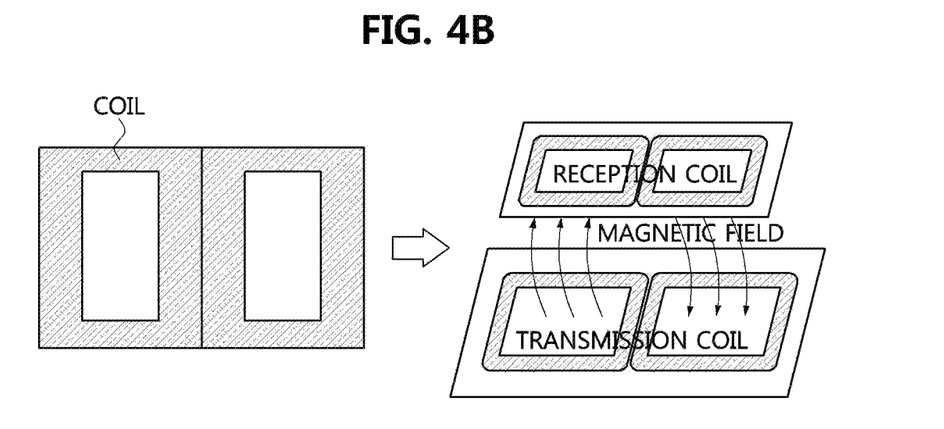

FIGS. 4A and 4B are conceptual diagrams for explaining coil shapes according to an embodiment of the present disclosure.

In the WPT system, inductive couplers may be designed with a variety of assembly topologies. Here, the assembly topology (or, the structure of the assembly) may be determined depending on the types of coils, polarity or non-polarity, and type of magnetic.

All of the assemblies (i.e., the terms collectively referred to as coils and backing structures used as the transmission pad or the reception pad) may be made to have fluxes only on one side of the assembly by proper use of ferrite or aluminum backing.

For example, non-polarized topologies may have a pole in the center of the assembly and have the opposite pole around the assembly. This polarity structure may cause the fluxes to exit the center of the assembly and return to all outer edges of the assembly. With reference to FIG. 4A, an assembly having a circular coil, one of the non-polarized topologies, may be identified. However, it shall not be construed to be construed as limited to the circular coil, and it shall be construed as including a square coil having a rectangular shape in place of the circular coil. The circular coil and the square coil may be collectively referred to as a circular/ square coil. When the assemblies with circular coils shown in the left side of FIG. 4A are used as the transmission and reception pads, a vertical field may be formed in space as shown in the right side of FIG. 4A, so that the fluxes exit the center of the transmission coil, return to the center of the reception coil, exit the outer edges of the reception coil, and enter to the outer edges of the transmission coil. These assemblies may be predominately sensitive to the vertical field.

On the other hand, polarized assemblies may have a north pole and a south pole at either end of the assembly structure. This polarity structure may cause the fluxes to form along the direction of the transmission and reception pads. With reference to FIG. 4B, an assembly having a polarized DD coil may be identified. Such the assembly may have a structure in which two D-shaped (or rectangular) coils are arranged adjacent to each other on a plane as shown in the left side of FIG. 4B. In this case, the fluxes of the DD coil may be formed differently depending on the direction of the transmission and reception pads. For example, as shown in the right side of FIG. 4B, the fluxes may exit the center of one D-shaped coil of the transmission pad and return to the center of a D-shaped coil of the reception pad, which faces the one D-shaped coil of the transmission pad. Also, the fluxes may exit the center of the other D-shaped coil of the reception pad and return to the center of the other D-shaped coil of the transmission pad. These assemblies may be predominately sensitive to the horizontal field. Here, the DD coil is used as an example of the polarized assembly, but a solenoid other than the DD coil may be used.

Figure 5:
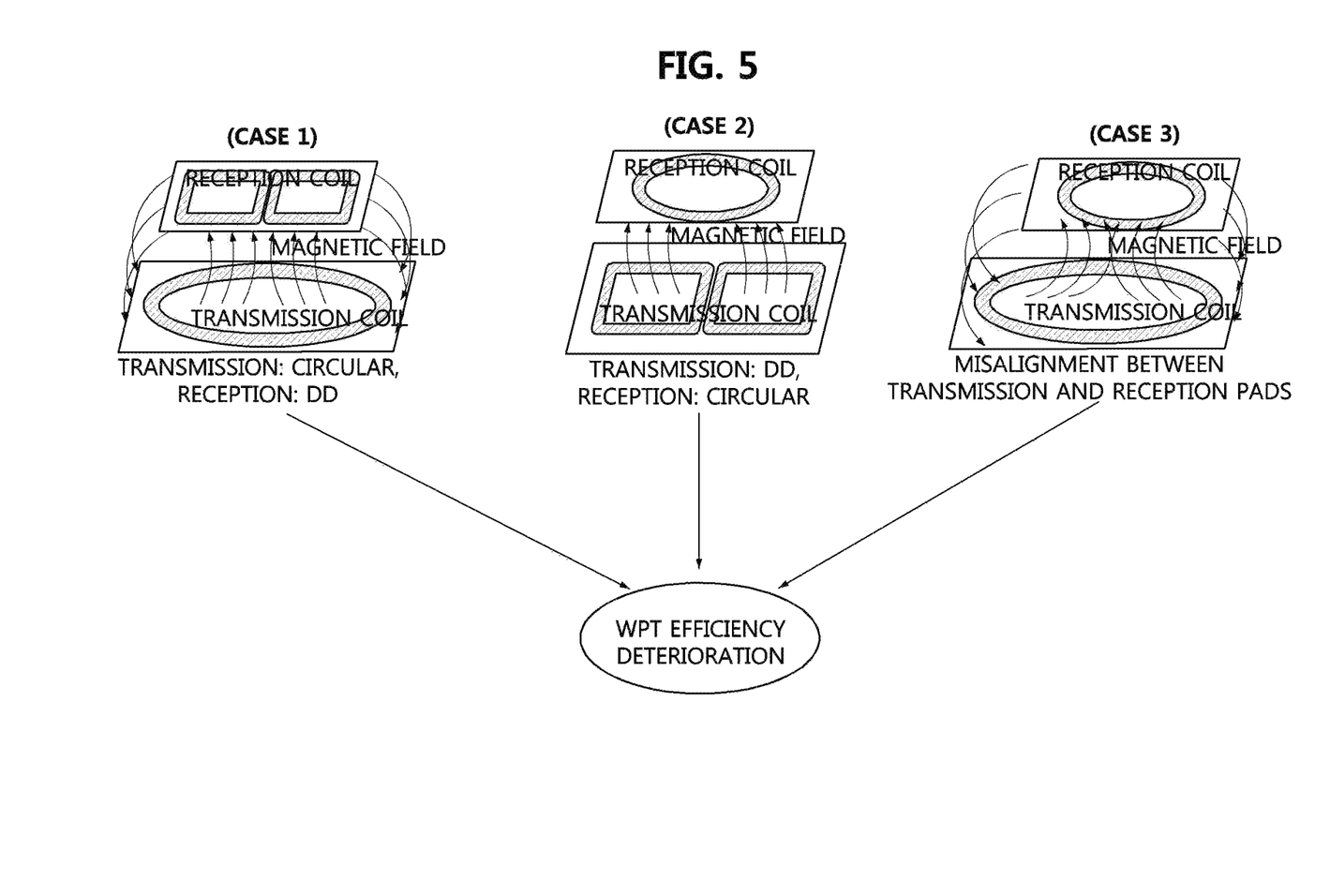
FIG. 5 is a diagram illustrating cases in which efficiencies are deteriorated in the EV WPT.

FIG. 5 is a diagram illustrating cases in which efficiencies are deteriorated in the EV WPT.

The GA and VA used in the EV WPT system may not be produced by the same producer. Similarly, the transmission and reception pads may not be produced by the same producer, and the assembly topologies of the transmission and reception pads may be different, even when produced by the same producer.

As shown in FIG. 5, several cases, in which WPT efficiencies are deteriorated due to a misalignment between the transmission pad and the reception pad or due to a mismatch between the assembly topologies of the transmission pad and the reception pad, may be identified.

Specifically, there may be cases where the assembly topologies of the transmission pad and the reception pad are different. For example, there may be a case in which the circular coil is used in the transmission pad and the DD coil is used in the reception pad as illustrated in Case 1 of FIG. 5, or a case in which the DD coil is used in the transmission pad and the circular coil is used in the reception pad as illustrated in Case 2 of FIG. 5. In the cases of FIG. 5, since the coils having different shapes are electromagnetically coupled to each other, a resonance condition may not be satisfied, so that voltage and current transferred to the output are decreased and the WPT efficiency may be deteriorated. Also, as illustrated in Case 3 of FIG. 5, although the transmission pad and the reception pad use the same circular coils, it may be seen that the positions of the two coils are not corresponding to each other and the respective central axes are shifted from each other. Thus, the coupling coefficient, the resonance condition, and the like may be changed even in Case 3 of FIG. 5, and the WPT efficiency may be deteriorated.

Figure 6A:
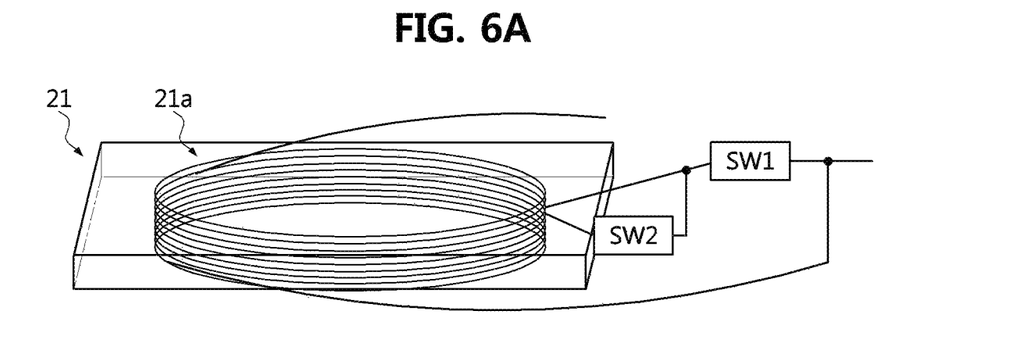
FIG. 6A is a conceptual diagram illustrating an example in which at least one switch is used to control the number of turns of a transmission coil included in a transmission pad according to embodiments of the present disclosure.
Figure 6B:
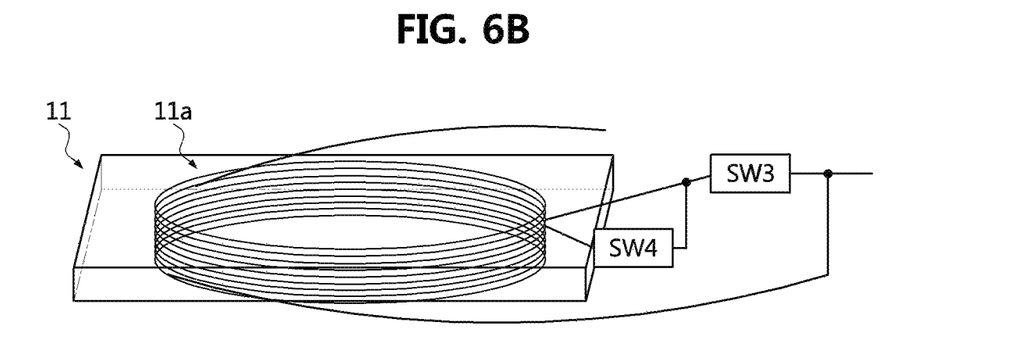
FIG. 6B is a conceptual diagram illustrating an example in which at least one switch is used to control the number of turns of a reception coil included in a reception pad according to embodiments of the present disclosure.
Figure 7:
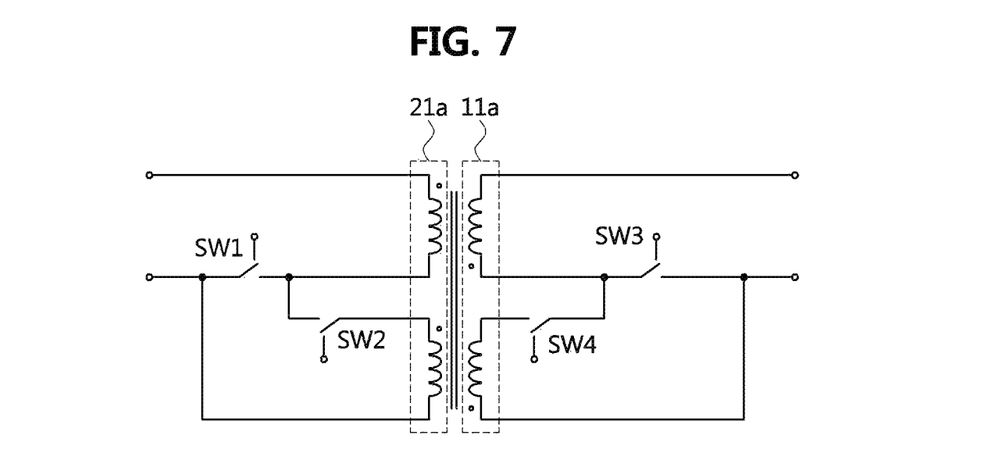
FIG. 7 is an equivalent circuit diagram illustrating the transmission coil and the reception coil to which the switches are connected.

FIG. 6A is a conceptual diagram illustrating an example in which at least one switch is used to control the number of turns of a transmission coil included in a transmission pad according to embodiments of the present disclosure, and FIG. 6B is a conceptual diagram illustrating an example in which at least one switch is used to control the number of turns of a reception coil included in a reception pad according to embodiments of the present disclosure. Also, FIG. 7 is an equivalent circuit diagram illustrating the transmission coil and the reception coil to which the switches are connected.

In order to prevent the deterioration of the WPT efficiency, as illustrated in the cases according to FIG. 5, the resonance condition, the coupling coefficient, the output voltage, the output current, or the like, which vary depending on the position alignment or the types of coils to be coupled, should be compensated. In an embodiment of the present disclosure, a method of compensating for the variations by changing the number of turns in the coils used in the transmission pad and/or the reception pad by using at least one switch is proposed.

Referring first to FIG. 6A, a split node dividing the entire turns (i.e., n1) by a preset ratio may be identified in a transmission coil 21a of a transmission pad 21. Also, a second switch SW2 for closing or opening the split node may be configured. Here, for ease of description, hereinafter, the preset ratio may be referred to as (n11:n12), and it may be defined that n11+n12=n1. In addition, a first switch SW1 for closing or opening a connection between an input/output node of the transmission coil and the split node may be configured. The two switches may be connected to the transmission coil in the above-described manner, and the two switches may be turned ON or OFF to control the number of turns of the transmission coil to be n1 (i.e., n11+n12) or n11.

Referring next to FIG. 6B, similarly to the case of FIG. 6A, the number of turns of a reception coil 11a of a reception pad 11 may be controlled by using two switches. That is, a split node dividing the entire turns n2 by a preset ratio may be identified in the reception coil 11a, a fourth switch SW4 for closing or opening the split node may be configured, and a third switch SW3 for closing or opening a connection between an input/output node (or, an end node) of the reception coil and the split node may be configured. Here, the preset ratio may be referred to as (n21:n22), and it may be defined that n21+n22=n2.

The transmission coil 21a and the reception coil 11a to which the switches according to FIGS. 6A and 6B are connected may be represented by an equivalent circuit of a transformer type as shown in FIG. 7. In FIG. 7, first to fourth switches SW1 to SW4 may be interpreted as the same as the switches according to FIGS. 6A and 6B. In FIG. 7, a turn ratio of the transmission coil and the reception coil according to ON/OFF of each of the switches may be shown in Table 1 below.

TABLE 1

| Type | SW1 | SW2 | SW3 | SW4 | Turn ratio |
|------|-----|-----|-----|-----|------------|
| 1 | ON | OFF | ON | OFF | n11:n21 |
| 2 | ON | OFF | OFF | ON | n11:(n21 + n22) |
| 3 | OFF | ON | ON | OFF | (n11 + n12):n21 |
| 4 | OFF | ON | OFF | ON | (n11 + n12):(n21 + n22) |

Referring to Table 1, it can be seen that the transmission coil and the reception coil may be operated with a total of four turn ratios according to the ON/OFF states of the first to fourth switches SW1 to SW4. In Table 1, the type 4 is the same as the turn ratio when the switches are not used, so that it may be usually a default switch control state. The switches may be controlled in such a manner that a current switch control state is transitioned from the default switch control state to a switch control state of the type 1, 2 or 3. However, the default switch control state may vary according to a turn ratio satisfying the optimal control condition such as a resonance frequency. Also, the turn ratios are represented by a proportional expression (i.e., the number of turns of the transmission coil: the number of turns of the reception coil), but in the following equations, the number of turns of the transmission coil relative to the number of turns of the reception coil may also be defined as a turn ratio.

Meanwhile, as explained above, when an x-axis and/or y-axis deviation (or, center axis deviation) between the transmission pad and the reception pad occurs or the types of coils included in the pads are different, the output voltage of the reception coil 11a may be decreased. Also, when a vertical distance between the transmission pad and the reception pad is reduced (or, this may be explained as a decrease of a Z-class (i.e., a class corresponding to a VA coil ground clearance range) of the reception pad, and the Z-class of the reception pad will be described with reference to Table 2), the output voltage of the reception coil 11a may be increased. Therefore, the switches SW1 to SW4 may be controlled based on the output voltage and the output current at the transmission coil 21a and the reception coil 11a.

For example, when the voltage and current of the transmission coil 21a are respectively defined as V1 and I1, the output voltage and current appearing in the reception coil 11a are respectively defined as V2 and I2, and the turn ratio is defined as n, on the basis of the transformer equivalent circuit (assuming an ideal transformer) shown if FIG. 7, the output voltage V2 may satisfy the following Equation 1.

$$V2 = \frac{V1}{n} \quad \text{[Equation 1]}$$

Referring to Equation 1, the output voltage V2 of the reception coil 11a may be inversely proportional to the turn ratio. Therefore, when the output voltage V2 of the reception coil 11a is low, the output voltage V2 of the reception coil 11a may be increased by reducing the turn ratio n. Referring to Table 1, in order to reduce the turn ratio, the switch control state of the type 2 (i.e., turning on the first switch and the fourth switch, and turning off the second switch and the third switch) may be used. On the other hand, when the output voltage V2 of the reception coil 11a is high, in order to increase the turn ratio, the switch control state according to the type 3 (i.e., turning on the second switch and the third switch, and turning off the first switch and the fourth switch) may be used. Also, according to the same definition as in Equation 1, the current I1 of the transmission coil and the current I2 of the reception coil may satisfy the following Equation 2.

$$I2 = n \times I1 \quad \text{[Equation 2]}$$

Referring to Equation 2, the output current I2 of the reception coil 11a may be proportional to the turn ratio. Therefore, when the output current I2 of the reception coil 11a is low, the switch control state of the type 3 of Table 1 may be applied. On the other hand, when the output current I2 of the reception coil 11a is high, the switch control state of the type 2 of Table 1 may be applied.

Meanwhile, in the above-described embodiment, a switch for one split node is used for each of the transmission coil and the reception coil so as to have two stages of the number of turns. For this reason, four types of turn ratio combinations shown in Table 1 are available. However, by further connecting additional switches, the transmission coil and the reception coil may be configured to have three or more stages respectively. In this case, an example in which the transmission coil or the reception coil has a predetermined number of turns of k stages is described below. First, (k−1) split nodes for dividing the transmission coil (or, reception coil) may be determined, and (k−1) switches for closing or opening the (k−1) split nodes. Also, additional (k−1) switches each of which connects an input/output node and each of the (k−1) split nodes may be configured so as to configure the transmission coil or reception coil having the predetermined number of k stages (k≥2).

Figure 8:
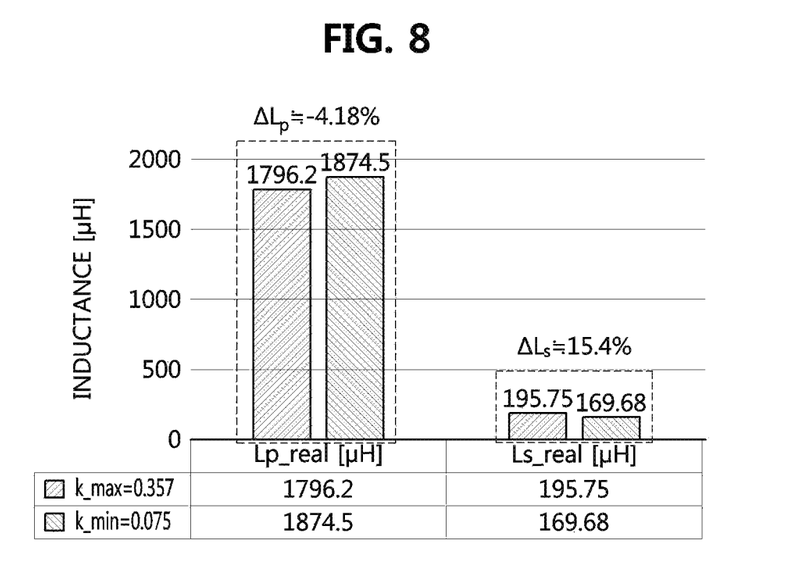
FIG. 8 is a graph for explaining a method of controlling switches based on an alignment state between a transmission pad and a reception pad.

FIG. 8 is a graph for explaining a method of controlling switches based on an alignment state between a transmission pad and a reception pad.

As a method for controlling the turns of the coil to which at least one switch is connected, an alignment state between the transmission pad and the reception pad may be considered. The classes for determining a vertical alignment position of the reception pad described above with reference to FIG. 3 may be expressed as shown in Table 2 below.

TABLE 2

| Z-Class | VA coil ground clearance range (mm) |
|---|---|
| Z1 | 100-150 |
| Z2 | 140-210 |
| Z3 | 170-250 |

Referring to Table 2, it is identified that the vertical alignment positions of the reception pad are classified based on the vertical distance (i.e., VA coil ground clearance range, in mm) between a ground surface and a lower surface of the reception coil (i.e., VA coil). The vertical alignment positions of the reception pad such as Z1 to Z3 may be referred to as Z-classes, Z1 corresponds to the class 1 described in FIG. 3, Z2 corresponds to the class 2, and Z3 corresponds to the class 3. Also, the vertical distance increases substantially from Z1 to Z3, and the class rating is higher. However, there may be an exception that the vertical distance decreases when the class Z1 changes to the class Z2.

Generally, when a positional deviation (or a central axis deviation) occurs between the transmission pad and the reception pad, the inductances of the transmission coil and the reception coil may fluctuate. Here, since the inductance (or magnetic inductance) of the transmission coil or the reception coil is proportional to the square of the number of turns in the corresponding coil, the switches may be controlled in such a manner that the number of turns is increased as the inductance becomes smaller and the number of turns is decreased as the inductance becomes larger.

Also, when the Z-class of the reception pad varies, the vertical distance between the transmission pad and the reception pad may vary. Specifically, as the vertical distance increases as the Z-class of the reception pad varies, the magnetic coupling between the transmission pad and the reception pad may be decreased, and at this time, the switches may be controlled to increase the inductance of the transmission coil or the reception coil. Conversely, as the vertical distance decreases, the magnetic coupling between the transmission pad and the reception pad may be increased, so that the switches may be controlled to reduce the inductance of the transmission coil or the reception coil. At this time, the inductance of the transmission coil or the reception coil may be controlled based on the fact that the inductance of the transmission coil or the reception coil is proportional to the square of the number of turns in the corresponding coil.

Examples of performing the control of the switches according to FIGS. 6A and 6B (or FIG. 7) based on the Z-classes of the reception pad according to Table 2 and/or the positional deviation between the transmission pad and the reception pad are shown in the following Table 3.

TABLE 3 n11 = 20, n12 = 5, n21 = 20, n22 = 5

| Type | SW1 | SW2 | SW3 | SW4 | Turn ratio | Application example |
|---|---|---|---|---|---|---|
| 1 | ON | OFF | ON | OFF | n11:n21 = 20:20 | e.g., when a misalignment occurs or when Z-class is transitioned to Z2 in the state of Type 3 |
| 2 | ON | OFF | OFF | ON | n11:(n21 + n22) = 20:25 | e.g., when a misalignment occurs or when Z-class is transitioned from Z2 to Z3 in the state of Type 1 |
| 3 | OFF | ON | ON | OFF | (n11 + n12):n21 = 25:20 | aligned state when the Z-class is Z1 |
| 4 | OFF | ON | OFF | ON | (n11 + n12):(n21 + n22) = 25:25 | e.g., when a misalignment occurs or when Z-class is transitioned to Z2 in the state of Type 3 |

Referring to Table 3, examples when n11 is set to 20, n12 is set to 5, n21 is set to 20, and n22 is set to 5 are shown. In the examples, n1 (=n11+n12) is 25, and n2 (=n21+n22) is 25 identically to the case of Table 1. That is, the entire turns of the transmission coil and the reception coil are divided by a preset ratio 20:5 (i.e., 4:1).

In Table 3, types 1 to 4 may indicate switch control states of the first to fourth switches SW1 to SW4 shown in FIGS. 6A to 6B or FIG. 7. The switch control state of the type 3 in Table 3 (i.e., the state in which the second switch and the third switch are ON, and the first switch and the fourth switch are OFF) may assume that the number of turns in the transmission coil and the reception coil are optimally controlled in consideration of the resonance condition, the coupling coefficient, the output voltage and current, and the like, when the Z-class of the reception pad is Z1. That is, the type 3 becomes a default switch control state differently from the case described with reference to Table 1.

Referring to Table 3, in the case that the switches are currently in the switch control state of the type 3, if the x-axis/y-axis deviation occurs between the transmission and reception pads or the inductance (or magnetic inductance) of the transmission coil included in the transmission pad increases as the Z-class of the reception pad is changed to Z2, the inductance of the transmission coil may be decreased by lowering the number of turns in the transmission coil by transitioning the switches to the switch control state of the type 1 (i.e. the state in which the first switch and the third switch are ON, and the second switch and the fourth switch are OFF). This is because the magnetic inductance of the transmission coil is proportional to the square of the number of turns in the transmission coil. If the number of turns in the transmission coil is decreased, the turn ratio is also decreased, so that the output voltage according to Equation 1 may be increased.

On the other hand, in the case that the switches are currently in the switch control state of the type 3, if the x-axis/y-axis deviation occurs between the transmission and reception pads or the inductance of the reception coil included in the reception pad decreases as the Z-class of the reception pad is changed to Z2, the inductance of the reception coil may be increased by increasing the number of turns in the reception coil by transitioning the switches to the switch control state of the type 4 (i.e., the state in which the second switch and the fourth switch are ON, and the first switch and the third switch are OFF). If the number of turns in the reception coil is increased, the turn ratio is also decreased, so that the output voltage according to Equation 1 may be increased.

Also, in the case that the switches are currently in the switch control state of the type 1, if the x-axis/y-axis deviation of the reception pad occurs in the Z2 class or the inductance of the reception coil decreases as the Z-class of the reception pad is changed to Z3, the inductance of the reception coil may be increased and the output voltage may be increased by increasing the number of turns in the reception coil by transitioning the switches to the switch control state of the type 2 (i.e., the state in which the first switch and the fourth switch are ON, and the second switch and the third switch are OFF).

Referring to FIG. 8, the inductance $L_{p\_real}$ of the transmission coil and the inductance $L_{s\_real}$ of the reception coil measured in the application examples according to Table 3 may be confirmed.

First, referring to the inductance of the transmission coil, in the control according to the type 3, when the maximum coupling coefficient ($k\_max$) is 0.357, the inductance of the transmission coil is 1796.2 μH and the inductance of the reception coil is 195.75 μH. When a positional deviation of the transmission and reception pads occurs, the inductance of the transmission coil becomes 1874.5 μH and the inductance of the reception coil becomes 169.68 μH when the minimum coupling coefficient ($k\_min$) is 0.075. If the inductance of the transmission coil increases by 4.18%, the switch control state may be changed from the type 3 to the type 1 in order to lower the inductance of the transmission coil by 4.18%. Also, if the inductance of the reception coil is also reduced by 15.4%, the switching control state may be changed from the type 3 to the type 4 in order to increase the inductance of the reception coil by 15.4%.

Meanwhile, since the inductance of the transmission coil or the reception coil may be explained as the inductance of the transmission pad or the reception pad, the inductance of the transmission coil or the reception coil is not limited to the inductance of the coil.

Figure 9:
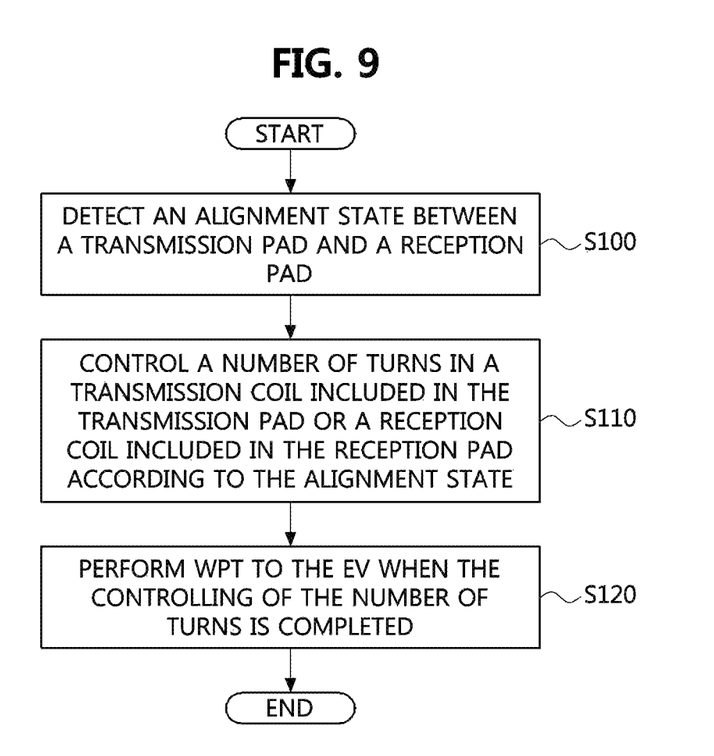
FIG. 9 is a flowchart illustrating a WPT method using control of the number of turns in a coil, which is performed by an apparatus for transferring wireless power to an EV, according to embodiments of the present disclosure.

FIG. 9 is a flowchart illustrating a WPT method using control of the number of turns in a coil, which is performed by an apparatus for transferring wireless power to an EV, according to embodiments of the present disclosure.

As shown in FIG. 9, a WPT method according to embodiments of the present disclosure may comprise a step S100 of detecting an alignment state between a transmission pad and a reception pad, a step S110 of controlling the number of turns in a transmission coil included in the transmission pad or a reception coil included in the reception pad according to the alignment state, and a step S120 of performing WPT to the EV when the controlling of the number of turns is completed.

The apparatus for transferring wireless power to an EV may be embedded in an EV, or may be embedded in a charging station. In the case of being embedded in an EV, the control of the number of turns in the transmission coil may be performed by transmitting a command to a GA side through communication with a GA controller. Also, in the case of being embedded in the charging station, the control of the number of turns in the reception coil may be performed by transmitting a command to a VA side through communication with a VA controller of the EV which is a target of the WPT.

The step S100 may include detecting a Z-class (i.e., Z-gap) of the reception pad determined according to a vertical distance between the ground surface and the reception pad.

The transmission coil or the reception coil may be connected to at least one switch, and the number of turns in the transmission coil or the reception coil may be controlled as the at least one switch connected thereto is controlled.

The at least one switch may comprise at least one first switch connected to the input and output node of the transmission coil or the reception coil and at least one split node dividing the transmission coil or the reception coil by a preset ratio, and at least one second switch for closing or opening the at least one split node.

The step S110 may be performed when the deviation between the center axis of the transmission pad and the center axis of the reception pad according to the alignment state is equal to or greater than a preset threshold value, or when the shapes of the transmission and reception coils are different from each other.

In the step S110, the at least one switch may be controlled so that the turn ratio, which represents a ratio of the number of turns in the transmission coil to the number of turns in the reception coil, is decreased when the output voltage of the reception coil is less than a preset threshold value.

The step S110 may be performed when the Z-class of the reception pad becomes different from a predetermined class.

In the step S110, the at least one switch may be controlled so that the number of turns in the transmission coil or the reception coil is increased, when the Z-class of the reception pad is higher than the predetermined class. In this case, the at least one switch may be controlled so that the turn ratio representing the ratio of the number of turns in the transmission coil to the number of turns in the reception coil is decreased.

The step S120 may not be construed to be limited to being performed directly by the apparatus for transferring wireless power. That is, as being interpreted to mean being performed indirectly by the apparatus, the step S120 may also be performed in cooperation with other apparatuses (GA, VA or various controllers).

Figure 10:
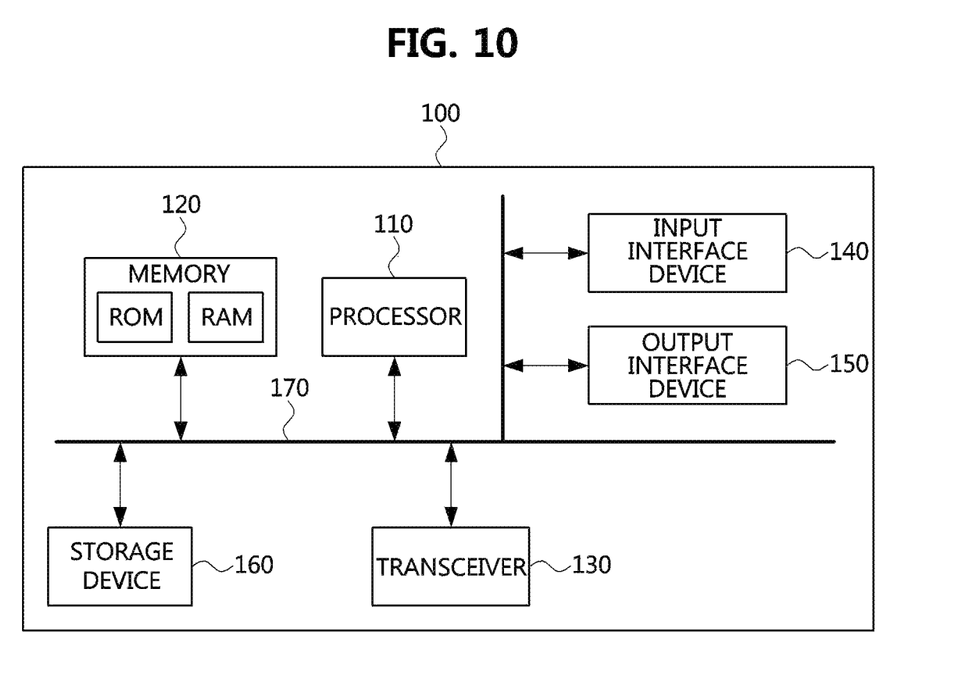
FIG. 10 is a block diagram illustrating an apparatus for transferring wireless power to an EV by using control of the number of turns in a coil, according to embodiments of the present disclosure.

FIG. 10 is a block diagram illustrating an apparatus for transferring wireless power to an EV by using control of the number of turns in a coil, according to embodiments of the present disclosure.

As shown in FIG. 10, an apparatus 100 according to an embodiment of the present disclosure may comprise at least one processor 110 and a memory 120 for storing instructions executed by the at least one processor 110.

The at least one processor 110 may be a central processing unit (CPU), a graphics processing unit (GPU), or a dedicated processor on which the methods in accordance with embodiments of the present disclosure are performed. Each of the memory 120 and a storage device 160 may be composed of at least one of a volatile storage medium and a non-volatile storage medium. For example, the memory 120 may comprise at least one of a read only memory (ROM) and a random access memory (RAM).

Also, the apparatus 100 according to an embodiment of the present disclosure may include a transceiver 130 for performing communications via a wireless network. The apparatus 100 may further include an input interface device 140, an output interface device 150, the storage device 160, and the like. Each component included in the apparatus 100 may be connected by a bus 170 and communicate with each other. However, each component included in the apparatus 100 may be connected to the at least one processor 110 via an individual interface or a separate bus, rather than the common bus 170. For example, the at least one processor 110 may be connected to at least one of the memory 120, the transceiver 130, the input interface device 140, the output interface device 150, and the storage device 160 via a dedicated interface.

At least one step performed by the at least one processor according to the instructions may comprise a step of detecting an alignment state between a transmission pad and a reception pad, a step of controlling the number of turns in a transmission coil included in the transmission pad or a reception coil included in the reception pad according to the alignment state, and a step of performing WPT to the EV when the controlling of the number of turns is completed.

The step of detecting an alignment state may include detecting a Z-class of the reception pad determined according to a vertical distance between the ground surface and the reception pad.

The transmission coil or the reception coil may be connected to at least one switch, and the number of turns in the transmission coil or the reception coil may be controlled as the at least one switch connected thereto is controlled.

The at least one switch may comprise at least one first switch connected to the input and output node of the transmission coil or the reception coil and at least one split node dividing the transmission coil or the reception coil by a preset ratio, and at least one second switch for closing or opening the at least one split node.

The controlling of the number of turns may be performed when the deviation between the center axis of the transmission pad and the center axis of the reception pad according to the alignment state is equal to or greater than a preset threshold value, or when the shapes of the transmission and reception coils are different from each other.

In the controlling of the number of turns, the at least one switch may be controlled so that the turn ratio, which represents a ratio of the number of turns in the transmission coil to the number of turns in the reception coil, is decreased when the output voltage of the reception coil is less than a preset threshold value.

The controlling of the number of turns may be performed when the Z-class of the reception pad becomes different from a predetermined class.

In the controlling of the number of turns, the at least one switch may be controlled so that the number of turns in the transmission coil or the reception coil is increased, when the Z-class of the reception pad is higher than the predetermined class. Here, the predetermined class may correspond to a Z-class determined by a manufacturer of the VA or the EV, or may be a Z-class of the reception pad built in the EV that has just completed the WPT immediately before. In this case, the at least one switch may be controlled so that the turn ratio representing the ratio of the number of turns in the transmission coil to the number of turns in the reception coil is decreased.

Meanwhile, the apparatus 100 for transferring wireless power to an EV may be embedded in an EV or a charging station as described with reference to FIG. 9. Hereinafter, embodiments in which the apparatus 100 is embedded in an EV may be implemented as follows.

According to embodiments of the present disclosure, an EV may comprise a reception pad including a reception coil electromagnetically coupled to a transmission coil included in a transmission pad to receive power, at least one switch connected to the reception coil to control the number of turns in the reception coil, a VA controller for monitoring a parameter indicating a state of the EV and controlling an output power level of the reception pad by performing communications with a GA, and a WPT controller for controlling the at least one switch by detecting an alignment state between the transmission pad and the reception pad. The at least one switch may comprise at least one first switch connected to the input and output node of the transmission coil or the reception coil and at least one split node dividing the transmission coil or the reception coil by a preset ratio, and at least one second switch for closing or opening the at least one split node.

The WPT controller may be a device corresponding to all or a part of the apparatus 100 for transferring wireless power to an EV. Accordingly, the description of FIG. 10 above may be construed as applicable to the WPT controller.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for an exemplary embodiment of the present disclosure or can be publicly known and available to those who are skilled in the field of computer software.

Examples of the computer readable medium may include a hardware device including ROM, RAM, and flash memory, which are configured to store and execute the program instructions. Examples of the program instructions include machine codes made by, for example, a compiler, as well as high-level language codes executable by a computer, using an interpreter. The above exemplary hardware device can be configured to operate as at least one software module to perform the operation of the present disclosure, and vice versa. Also, the above-described method or apparatus may be implemented by combining all or a part of the structure or functions, or may be implemented separately.

While the embodiments of the present disclosure and their advantages have been described in detail, it should be understood that various changes, substitutions, and alterations may be made herein without departing from the scope of the present disclosure.

What is claimed is:

1. A method for wireless power transfer (WPT) to an electric vehicle (EV) performed by a wireless charging apparatus, the method comprising:
   detecting, by the wireless charging apparatus, an alignment state between a transmission pad mounted in the wireless charging apparatus and a reception pad mounted in the EV;
   controlling, by the wireless charging apparatus, a number of turns in a transmission coil included in the transmission pad or a reception coil included in the reception pad according to the detected alignment state; and
   performing, by the wireless charging apparatus, WPT to the EV after the controlling of the number of turns in the transmission coil or the reception coil is completed,
   wherein the detecting of the alignment state comprises detecting a Z-class which determines a vertical alignment position of the reception pad,
   wherein the Z-class is determined based on a vertical distance between a ground surface and a lower surface of the reception coil, and
   wherein the controlling of the number of turns in the transmission coil or the reception coil is performed when the Z-class of the reception pad is different from a predetermined class.

2. The method according to claim 1, further comprising controlling at least one switch connected to the transmission coil or the reception coil while the number of turns in the transmission coil or the reception coil is controlled.

3. The method according to claim 2, wherein the at least one switch comprises:
   at least one first switch connected to an input node and an output node of the transmission coil or the reception coil and at least one split node dividing the transmission coil or the reception coil by a preset ratio; and
   at least one second switch configured to open or close the at least one split node.

4. The method according to claim 2, wherein the controlling of the number of turns in the transmission coil or the reception coil is performed when a deviation between a center axis of the transmission pad and a center axis of the reception pad according to the detected alignment state is greater than or equal to a preset threshold value, or performed when respective shapes of the transmission coil and the reception coil are different from each other.

5. The method according to claim 4, further comprising, when the controlling of the number of turns in the transmission coil or the reception coil is performed, controlling the at least one switch to decrease a turn ratio, which represents a ratio of the number of turns in the transmission coil to the number of turns in the reception coil, when an output voltage of the reception coil is less than a preset threshold value.

6. The method according to claim 1, further comprising, when the controlling of the number of turns in the transmission coil or the reception coil is performed, controlling the at least one switch to increase the number of turns in the transmission coil or the reception coil when the Z-class of the reception pad is greater than the predetermined class.

7. The method according to claim 6, further comprising further controlling the at least one switch to decrease the turn ratio.

8. An apparatus for performing wireless power transfer (WPT) to an electric vehicle (EV), the apparatus comprising at least one processor and a memory storing instructions executable by the at least one processor, wherein the at least one processor is configured to:
- detect an alignment state between a transmission pad mounted in the wireless charging apparatus and a reception pad mounted in the EV;
- control a number of turns in a transmission coil included in the transmission pad or a reception coil included in the reception pad according to the detected alignment state; and
- perform WPT to the EV after the controlling of the number of turns in the transmission coil or the reception coil is completed,
- wherein the at least one processor is further configured to detect a Z-class which determines a vertical alignment position of the reception pad,
- wherein the Z-class is determined based on a vertical distance between a ground surface and a lower surface of the reception coil, and
- wherein the at least one processor is further configured to control the number of turns in the transmission coil or the reception coil when the Z-class of the reception pad is different from a predetermined class.

9. The apparatus according to claim 8, wherein the at least one processor is further configured to control at least one switch connected to the transmission coil or the reception coil while the number of turns in the transmission coil or the reception coil is controlled.

10. The apparatus according to claim 9, wherein the at least one switch comprises:
- at least one first switch connected to an input node and an output node of the transmission coil or the reception coil and at least one split node dividing the transmission coil or the reception coil by a preset ratio; and
- at least one second switch configured to open or close the at least one split node.

11. The apparatus according to claim 9, wherein the at least one processor is further configured to control the number of turns in the transmission coil or the reception coil when a deviation between a center axis of the transmission pad and a center axis of the reception pad according to the detected alignment state is greater than or equal to a preset threshold value, or when respective shapes of the transmission coil and the reception coil are different from each other.

12. The apparatus according to claim 11, wherein the at least one processor is further configured to control the at least one switch to decrease a turn ratio, which represents a ratio of the number of turns in the transmission coil to the number of turns in the reception coil, when an output voltage of the reception coil is less than a preset threshold value.

13. The apparatus according to claim 8, wherein the at least one processor is further configured to control the at least one switch to increase the number of turns in the transmission coil or the reception coil when the Z-class of the reception pad is greater than the predetermined class.

14. The apparatus according to claim 13, wherein the at least one processor is further configured to control the at least one switch to decrease the turn ratio.

15. An electric vehicle (EV) comprising:
- a reception pad including a reception coil electromagnetically coupled to a transmission coil included in a transmission pad mounted in a wireless charging apparatus, the reception pad configured to wirelessly receive power;
- at least one switch connected to the reception coil, the at least one switch configured to control a number of turns in the reception coil;
- a vehicle assembly (VA) controller configured to monitor a parameter indicating a state of the EV and to control an output power level of the reception pad through communication with a ground assembly (GA); and
- a wireless power transfer (WPT) controller configured to control the at least one switch by detecting an alignment state between the transmission pad and the reception pad,
- wherein the WPT controller is further configured to detect a Z-class which determines a vertical alignment position of the reception pad,
- wherein the Z-class is determined based on a vertical distance between a ground surface and a lower surface of the reception coil, and
- wherein the WPT controller is further configured to control the number of turns in the transmission coil or the reception coil when the Z-class of the reception pad is different from a predetermined class.

16. The EV according to claim 15, wherein the at least one switch comprises:
- at least one first switch connected to an input node and an output node of the transmission coil or the reception coil and at least one split node dividing the transmission coil or the reception coil by a preset ratio; and
- at least one second switch configured to open or close the at least one split node.

* * * * *